US006913226B2

(12) United States Patent
Huynh (10) Patent No.: US 6,913,226 B2
(45) Date of Patent: Jul. 5, 2005

(54) METHODS AND SYSTEMS FOR REDUNDANT CONTROL AND/OR FAILURE DETECTION

(75) Inventor: Neal V. Huynh, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/697,383

(22) Filed: Oct. 30, 2003

(65) Prior Publication Data

US 2005/0103932 A1 May 19, 2005

(51) Int. Cl.[7] ............................................. B64C 13/30
(52) U.S. Cl. ................................................. 244/75 R
(58) Field of Search ............................. 244/75 R, 220, 244/221, 223, 224, 228, 229, 230, 232, 233, 244/235; 74/501.5 R (56) References Cited

U.S. PATENT DOCUMENTS

| 3,473,407 | A | * | 10/1969 | Hicks ..................... 74/501.5 R |
| 4,004,537 | A | * | 1/1977 | Nilsson ................... 114/144 R |
| 4,142,699 | A | | 3/1979 | Arnquist et al. |
| 4,287,788 | A | * | 9/1981 | Baetke ................... 74/501.5 R |
| 4,318,308 | A | * | 3/1982 | Monteillet ............. 74/501.5 R |
| 4,705,236 | A | | 11/1987 | Rudolph |
| 4,762,294 | A | * | 8/1988 | Carl ......................... 244/75 R |
| 4,776,543 | A | * | 10/1988 | Stableford ................... 244/232 |
| 4,793,576 | A | * | 12/1988 | Frerk .......................... 244/228 |
| 5,050,086 | A | | 9/1991 | Lambregts |
| 5,456,428 | A | * | 10/1995 | Hegg .......................... 244/229 |
| 5,489,830 | A | * | 2/1996 | Fernandez ................... 318/628 |
| 5,538,209 | A | * | 7/1996 | Bowden et al. ............. 244/221 |
| 5,669,582 | A | | 9/1997 | Bryant et al. |
| 5,797,564 | A | | 8/1998 | Cartmell et al. |
| 5,806,806 | A | * | 9/1998 | Boehringer et al. ........ 244/196 |
| 5,839,697 | A | | 11/1998 | Tran |
| 5,868,359 | A | | 2/1999 | Cartmell et al. |
| 6,675,076 | B1 | * | 1/2004 | Moody ........................ 701/11 |

* cited by examiner

*Primary Examiner*—Galen Barefoot
(74) *Attorney, Agent, or Firm*—Perkins Coie LLP (57) ABSTRACT

Redundant control systems and/or failure detection systems and associated methods are disclosed herein. In one embodiment of the invention, the control system can include a first control link that transmits control inputs between at least one control input device and at least one control output device and a second control link, at least one portion of which is changeable from a disengaged state to an engaged state, the at least one portion being inactive when in the disengaged state. In another embodiment, the control system can include at least one detection system that detects failures of a control link. In yet another embodiment, the second control link can be automatically engaged when a failure in the first control link is detected.

32 Claims, 3 Drawing Sheets

METHODS AND SYSTEMS FOR REDUNDANT CONTROL AND/OR FAILURE DETECTION

TECHNICAL FIELD

The present invention relates to methods and systems for redundant control and/or failure detection, for example, as applied to aircraft flight control systems.

BACKGROUND

In order to meet Federal Aviation Regulations and satisfy safety concerns, present-day transport category aircraft are generally required to have robust flight control systems with redundant control paths. In order to provide redundancy in the flight control systems, manufacturers often utilize multiple control paths in both reversible and irreversible flight control systems, including fly-by-wire and fly-by-light flight control or augmentation systems.

Providing multiple control paths for each control axis often adds complexity, weight, and increased friction to an aircraft flight control system. This is true even for fly-by-wire flight control systems because they typically include mechanical components. The increased weight and friction due to multiple control paths can significantly increase the control system friction and breakout forces, i.e., the forces a pilot must exert to cause an initial movement of a flight control surface away from the trimmed or neutral position, including control centering forces. For example, the pilot must apply at least a threshold level of force to turn the yoke of a control system to the left or right before any lateral flight control surface begins to move. Accordingly, a "dead band" or "friction and breakout band" encompasses the range of forces between the left and right threshold levels. The magnitude of the friction and breakout forces can affect a pilot's ability to make small precise inputs around the trim point and can decrease aircraft predictability.

Figure 1:
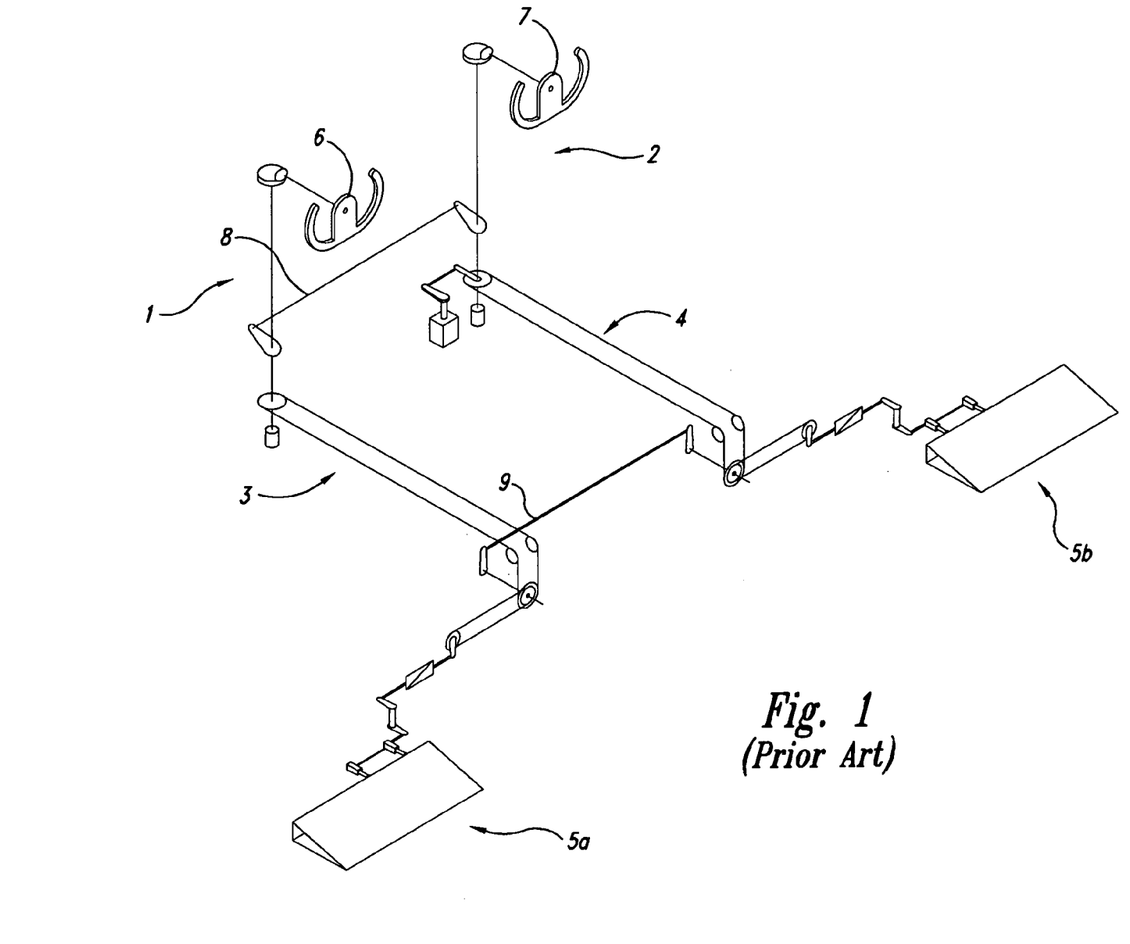
FIG. 1 is a partially schematic illustration of an aircraft lateral flight control system with two redundant control loops in accordance with the prior art.

FIG. 1 schematically illustrates a typical transport category aircraft lateral flight control system in accordance with the prior art. The control system has two redundant control loops. The pilot's control loop 1 includes a pilot's yoke 6 positioned to receive inputs from the pilot, a left cable loop 3, and other elements coupled to transmit pilot inputs from the pilot's yoke 6 to a left flight control surface 5a. The first officer's control loop 2 includes a first officer's yoke 7 positioned to receive inputs from the first officer, a right cable loop 4, and other elements coupled to transmit first officer inputs from the first officer's yoke 7 to a right flight control surface 5b. Both control loops 1, 2 are linked together by a forward connector 8 and an aft connector 9, so that when the pilot or the first officer makes a control input, (a) the control input is transmitted through both control loops 1, 2, and (b) both flight control surfaces 5a, 5b can be actuated. If the left cable loop 3 or the right cable loop 4 fails, the remaining cable loop provides continual lateral control of the aircraft by transmitting control inputs from either yoke 6, 7 to both control surfaces 5a, 5b. During normal operation, the left cable loop 3 and the right cable loop 4 both move in response to each aircrew input, and the friction and weight of both cable loops contribute to the friction and breakout force in the aircraft lateral flight control system.

SUMMARY

The present invention is directed toward apparatuses and methods for providing control system redundancies and/or for detecting control system failures. Particular embodiments of the invention are directed to aircraft flight control systems and piloted vehicles, and other embodiments are directed to other types of control systems, including those with human operators and those that are fully automated (e.g., unmanned aerial vehicles). In one aspect of the invention, the apparatuses and methods provide redundancy in an aircraft flight control system by combining a first control link to actively transmit control inputs between at least one control input device and at least one control output device, with a second control link, a portion of which is inactive during normal operation, but which is capable of actively transmitting control inputs between the at least one control input device and the at least one control output device when engaged. In further aspects of the invention, the second control link can be configured to be automatically engaged when a failure is detected in the first control link, or can be engaged by operator action, or can be engaged by another system.

In other aspects of the invention, an aircraft flight control system includes a failure detection system. In particular aspects of the invention, failure indications are provided to the operator or to other systems that interface with the aircraft flight control system. In other aspects of the invention, a portion of the first control link includes an elongated flexible input transmission member and the detection system is configured to monitor an amount of tension in the elongated flexible input transmission member, with a value of the tension being associated with at least one failure in the first control link. In yet another aspect of the invention, a coupler can be operatively coupled to the elongated flexible input transmission member and the detection system, and the detection system can be configured to detect the amount of tension in the elongated flexible input transmission member via the coupler.

DETAILED DESCRIPTION

Several specific details of the invention are set forth in the following description and in FIGS. 2–5 to provide a thorough understanding of certain embodiments of the invention. One skilled in the art, however, will understand that the present invention may have additional embodiments, and that other embodiments of the invention may be practiced without several of the specific features explained in the following description.

Figure 2:
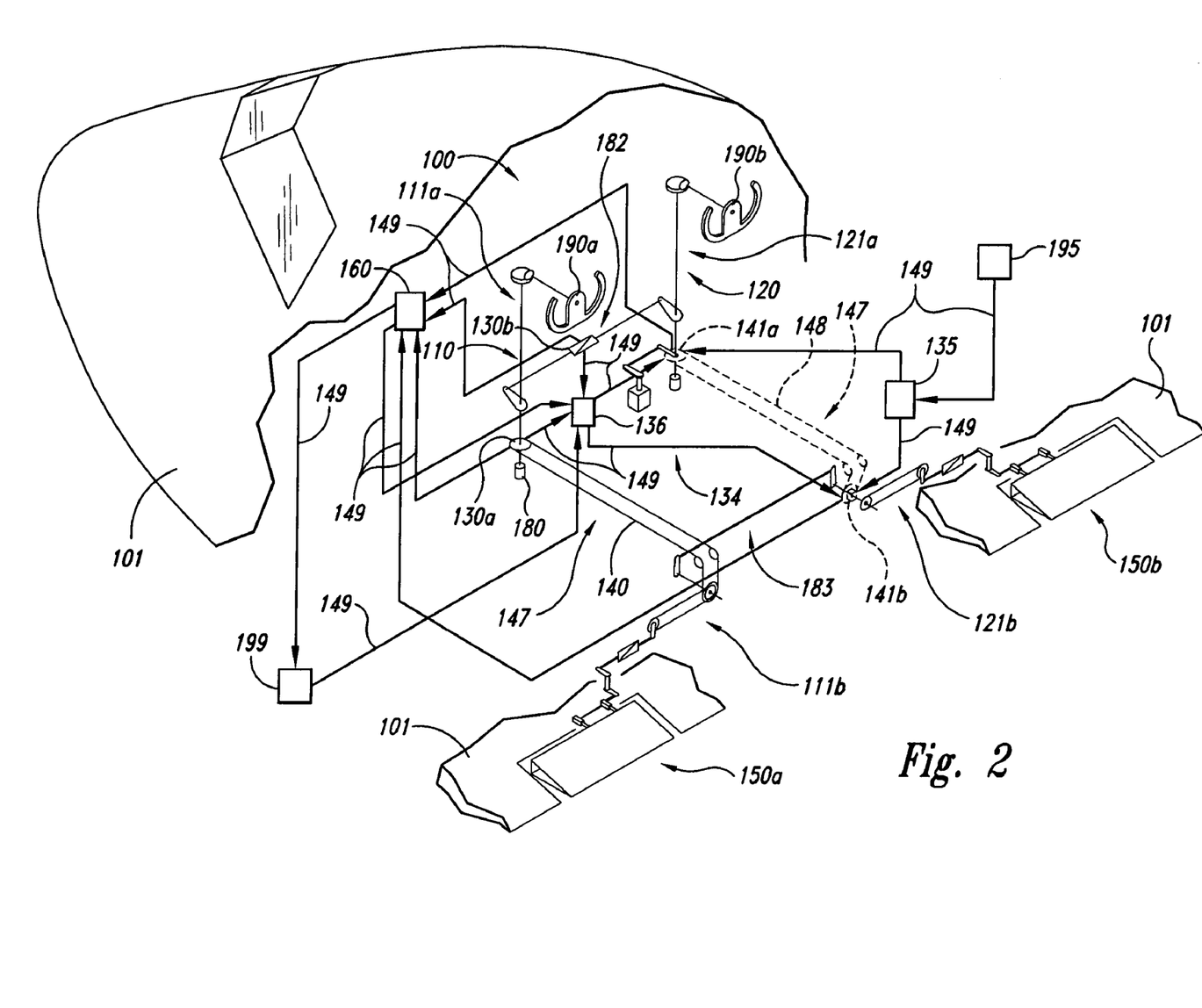
FIG. 2 is a partially schematic illustration of a control system with two control links and a detection system installed in an aircraft and configured in accordance with an embodiment of the invention.

This invention is directed generally toward methods and systems for redundant control and/or failure detection, for example, in the context of aircraft flight control systems. FIG. 2 is a partially schematic illustration of a control system 100 configured in accordance with an embodiment of the invention. In one aspect of this embodiment, the control system 100 includes at least one control input device 190 (two are shown in FIG. 2 as a first control input device 190a and a second control input device 190b). The control system 100 can also include at least one control output device 150 (two are shown in FIG. 2 as a first control output device 150a and a second control output device 150b). The number of control input devices 190 can be independent of the number of control output devices 150. Accordingly, in another embodiment, the control system 100 can have more or fewer than two control input devices 190 and/or more or fewer than two control output devices 150.

In any of these embodiments, the control system 100 can include at least two control links connected between the at least one control input device 190 and the at least one control output device 150. For example, in an embodiment shown in FIG. 2, the control system 100 can include a first control link 110 and a second control link 120. Each control link can include a transmission member 147. For example, the first control link 110 can include an elongated flexible input transmission member 140, e.g., a cable, chain, belt, or other flexible device. The elongated flexible input transmission member 140 couples a first portion 111a of the first control link 110 to a second portion 111b of the first control link 110, allowing input signals to be transmitted between the control input devices 190 and the control output devices 150. In a particular aspect of this embodiment, the control links 110, 120 can be installed in an aircraft 101 or other vehicle. Accordingly, the control input devices 190 can include pilot yokes, side-sticks, or other input controls (including non-pilot-actuated input controls), and the control output devices 150 can include ailerons, other flight control surfaces, or other types of devices configured to receive control inputs. In other embodiments, the control system 100 can operate in other environments.

At least a portion of the second control link 120 can include a transmission member 147 with a disengageable portion 148 (shown in dashed lines in FIG. 2). In FIG. 2, the transmission member 147 couples a first portion 121a of the second control link 120 with a second portion 121b of the second control link 120. The disengageable portion 148 can be inactive when the second control link 120 is in a disengaged state, for example, during normal operation. When the second control link 120 is in an engaged state, the disengageable portion 148 can be operatively coupled between the first and second portions 121a, 121b of the second control link 120. In this state, the second control link 120 transmits control inputs between the control input devices 190 and the control output devices 150, for example, if the first control link 110 fails or during other non-normal operations. In an embodiment shown in FIG. 2, the transmission member 147 and the disengageable portion 148 can include elongated flexible input transmission members, similar to those that can form part of the first control link 110. In other embodiments, these components can include non-flexible elements.

In one embodiment, the two control links 110, 120 are connected by one or more interconnects, for example, a forward interconnect 182 and an aft interconnect 183, which allow each control link 110, 120 to receive inputs from either or both control input devices 190a, 190b and transmit signals to either or both control output devices 150a, 150b. In other embodiments, the control links 110, 120 can share common elements, for example, a trim and feel device. In still other embodiments, both control links 110, 120 can function independently during normal operation. In any of these embodiments, the second control link 120 can take over the function of the first control link 110 when the disengageable portion 148 is engaged (e.g., if the first control link 110 becomes defective), as described below.

The disengageable portion 148 of the second control link 120 can be engaged and/or disengaged with an engagement link 134. The engagement link 134 can include at least one engagement device 141 (two are shown in FIG. 2 as a first engagement device 141a and a second engagement device 141b). In other embodiments, the engagement link 134 can include more or fewer engagement devices 141, or one or more engagement links 134 with multiple engagement devices 141.

The engagement devices 141a, 141b can allow the first and second portions 121a, 121b of the second control link 120 to move freely, yet not transmit any inputs through the disengageable portion 148 of the second control link 120 when the second control link 120 is in the disengaged state. The engagement link 134 can cause the second control link 120 to engage by operatively coupling the disengageable portion 148 to the first and second portions 121a, 121b of the second control link 120, allowing the second control link 120 to transmit control inputs between the control input devices 190 and the control output devices 150.

The engagement link 134 can transmit at least one signal to the engagement devices 141 from a detection system 130, an actuation control 135, or from other systems 199 along signal paths 149. The signals can be electrical, mechanical, pneumatic, hydraulic, optical, or other signals. In some embodiments, the engagement link 134 can transmit unmodified signals to the engagement devices 141 via the signal paths 149. In other embodiments of the invention, the engagement link 134 can include a signal conditioning device 136 that modifies or manipulates the signals. The signal conditioning device 136 can include a logic device, e.g., a microprocessor, that determines which signals should be directed to the engagement devices 141. The signal conditioning device 136 can also include a simple amplifier or, when signals are mechanical, a mechanical device that provides a mechanical advantage to the signals.

In some embodiments of the invention, the detection system 130, further described below, can be coupled to the engagement link 134 to trigger engagement and/or disengagement of the second control link 120 when predetermined conditions are met. In one embodiment, the predetermined condition can include a failure in the first control link 110 so that the two control links do not operate simultaneously. In other embodiments, the predetermined condition can include another mode, for example, flight below a given altitude, in which case the second control link 120 can operate simultaneously with the first control link 110.

In other embodiments, the actuation control 135 can receive an operator input 195 to engage, disengage, or both engage and disengage the second control link 120 in lieu of the engagement link 134 performing these functions. For example, the actuation control 135 can include an electrical or mechanical switch coupled to the at least one engagement device 141. The operator input 195 can be in response to indications provided by an annunciation system 160 or the detection system 130 discussed below. Other systems 199 (e.g., an autopilot system or other flight control component) can be coupled to the engagement link 134 to cause engagement of the second control link 120. In FIG. 2, the other systems 199 are shown coupled to the signal conditioning device 136 via signal paths 149. In other embodiments, the other systems 199 can be coupled to other portions of the engagement link 134, including the actuation control 135, and/or directly to the engagement devices 141.

In any of the foregoing embodiments, the disengageable portion 148 of the second control link 120 can include an elongated flexible input transmission member (generally similar to the flexible transmission member 140 of the first control link 110), for example, a cable. The engagement devices 141, as discussed above, can include mechanical or electromechanical clutches or brakes configured to engage and disengage the disengageable portion 148 of the second control link 120. Suitable clutches or brakes are available from Colfax PT Group of Quincy, Mass.; Formsprag of Warren, Mich.; Warner Electric of South Beloit, Ill.; and Rockwell Collins of Cedar Rapids, Iowa.

In further aspects of an embodiment of the control system 100 shown in FIG. 2, the control input devices 190 can include electromechanical servo actuators of an autopilot system, and the control output devices 150 can include hydraulic actuators coupled to corresponding control surfaces. The control links 110, 120 can provide links between flight control computers and mechanical portions of the control system 100. In yet another embodiment, the control links 110, 120 can include other mechanical or non-mechanical devices. For example, a wheel transducer 180 can sense the position of the control input devices 190 and can be coupled to other flight control surfaces (flight control surfaces in addition to control output devices 150a, 150b), for example, spoilers.

One feature of the foregoing embodiments is that during at least one phase of operation (e.g., normal operation), at least one portion of the second control link 120 is inactive. Accordingly, control input signals are only transmitted via the first control link 110 and not the second control link 120. This is unlike the arrangement shown in FIG. 1, in which all input signals are transmitted via both the left cable loop 3 and the right cable loop 4. Accordingly, the overall force, including the friction and breakout force, required to operate the control system 100 can be reduced, when compared to existing systems. An advantage of this arrangement is that it can improve the operator's ability to make small precise inputs, and can improve the predictability of the aircraft response to control inputs throughout the entire range of motion of the control system 100. Additionally, for some aircraft designs, this increase in predictability can reduce aircraft pilot coupling or pilot induced oscillation tendencies.

Another advantage of the foregoing arrangement is that, because the control links 110, 120 can have a reduced overall friction, the actuators coupled to the control links 110, 120 (e.g., autopilot system actuators) can be made smaller and lighter. In particular embodiments (for example, in irreversible flight control systems 100), the friction can be further reduced by using cables that are smaller in diameter than the 1/8 inch diameter cables currently used throughout the industry. In any of these embodiments, the system weight and friction can be reduced without sacrificing system redundancy because the inactive portion of the second control link 120 can be engaged only when needed, for example, if the first control link 110 fails. Such a failure can be detected by the detection system 130, as described below in greater detail.

The control system 100 can include at least one detection system 130 (two are shown in FIG. 2 as a first detection system 130a and a second detection system 130b). The first detection system 130a can detect a failure (e.g., a break) of the first control link 110, and the second detection system 130b can detect a failure (e.g., a motion limitation or jam) of either the first control link 110 or the second control link 120. In other embodiments, the control system 100 can include more or fewer detection systems 130, or detection systems 130 with multiple detection devices. In some embodiments, a detection system 130 can consist of a single detector.

In any of these embodiments, the detection system 130 can be configured to detect the status of at least one portion of the control system 100, for example, a portion of the first control link 110 and/or a portion of the second control link 120. The status of the control links 110, 120 can include whether or not the control links 110, 120 are engaged, whether or not the control links 110, 120 have undergone a partial failure, and/or whether or not the control links 110, 120 have undergone a total failure. A partial failure can prevent the full range of control inputs from being properly transmitted between the control input devices 190 and the control output devices 150, and can include a reduced tension level in a cable member. A total failure can prevent control inputs from being transmitted between the control input devices 190 to the control output devices 150, and can include a break in a cable member.

The detection systems 130 can transmit status signals to the annunciation system 160 via the signal paths 149. Accordingly, the annunciation system 160 can provide status indications of at least one portion of the control system 100 to an operator or to other systems 199. As discussed above, the signal paths 149 can be configured to transmit various types of signals, including electrical, mechanical, pneumatic, hydraulic, or optical signals. The annunciation system 160 can be coupled to the engagement link 134, and as discussed above, the engagement link 134 can be configured to automatically engage the second control link 120 when at least one failure is detected in the first control link 110 via the first or second detection systems 130a, 130b. Further details of the first detection system 130a are described below with reference to FIGS. 3 and 4. Further details of the second detection system 130b are described below with reference to FIG. 5.

Figure 3:
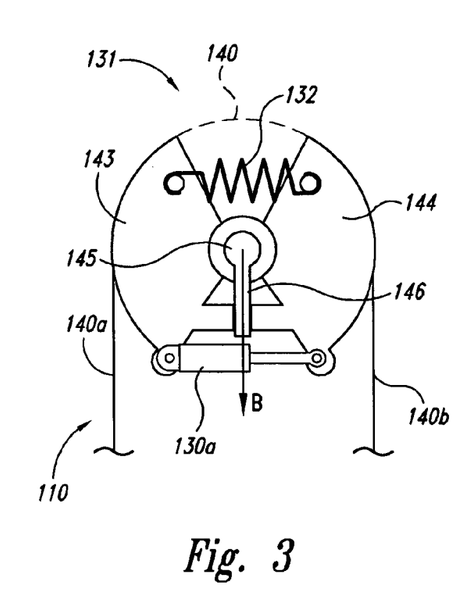
FIG. 3 is a partially schematic illustration of a coupler with a detection system and an elongated flexible input transmission member under a first amount of tension in accordance with an embodiment of the invention.

Referring now to FIG. 3, the first detection system 130a can be configured to detect at least one failure in the first control link 110. For example, when the first control link 110 includes the flexible transmission member 140, the first detection system 130a can be configured to detect an amount of tension in the flexible transmission member 140. In further aspects of this embodiment, the first detection system 130a can be coupled to the engagement link 134 (FIG. 2) and can transmit signals representative of the tension to the engagement link 134. Accordingly, if the first detection system 130a detects a tension in the flexible transmission member 140 below a selected value, the engagement link 134 can automatically engage the second control link 120 (FIG. 2). In one embodiment, the selected value can be non-zero and can represent a maximum permissible level of stretching in the flexible transmission member 140. In other embodiments, the selected value can be zero, representing a break in the flexible transmission member 140.

In an embodiment shown in FIG. 3, the first detection system 130a can be operatively coupled to the flexible transmission member 140 (e.g., a cable) via a coupler 131 (e.g., a pulley or a sprocket). The first detection system 130a can detect the amount of tension in the flexible transmission member 140 by detecting a characteristic or state of the coupler 131. For example, the coupler 131 can have a first coupler portion 143 pivotally coupled to a second coupler portion 144 at an axle 145 with at least one coupler portion movable relative to the other. In the normal state, the tension applied by the flexible transmission member 140 can operate to force the coupler portions 143, 144 against each other, or against a stop 146 attached to the axle 145, so that they rotate together as a unit as shown in FIG. 3. The first detection system 130a can include a linear variable differential transformer (LVDT) connected between the two coupler portions 143, 144 to detect movement of one coupler portion relative to the other caused by a change in the tension of the flexible transmission member 140. In other embodiments, the first detection system 130a can include a rotary variable differential transformer (RVDT), or other type of sensing device, to detect movement of one coupler portion relative to the other.

Figure 4:
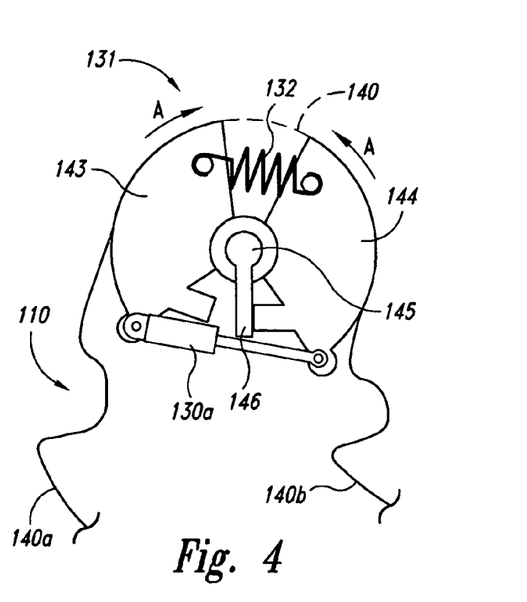
FIG. 4 is a partially schematic illustration of a coupler with a detection system and an elongated flexible input transmission member under a second amount of tension in accordance with an embodiment of the invention.

In one embodiment shown in FIG. 3, the flexible transmission member 140 can include multiple separate portions (two are shown in FIG. 3 as a first portion 140a and a second portion 140b, each coupled to one of the coupler portions 143, 144). In another embodiment (represented by the dashed lines in FIG. 3), the flexible transmission member 140 can extend around the perimeter of both coupler portions 143, 144. In either embodiment, if the tension in the flexible transmission member 140 falls (e.g., when the flexible transmission member 140 breaks or becomes slack, as shown in FIG. 4), at least one coupler portion can move relative to the other as indicated by arrows A. This movement can be caused by the release in energy from the breaking flexible transmission member 140 and/or by a force generating mechanism 132 (e.g., a spring), which applies a force in the direction of arrows A. As the coupler portions 143, 144 move, the first detection system 130a detects the change in characteristic or state of the coupler 131 associated with the change in tension of the flexible transmission member 140.

In another embodiment of the invention, the first detection system 130a can include a force transducer coupled to the axle 145 of the coupler 131 and be configured to detect a radial force at the coupler mounting point. The tension in the flexible transmission member 140 applies a radial force to the coupler mounting point in the direction of arrow B (FIG. 3). If the tension in the flexible transmission member 140 changes, the detection system 130 detects the change in the radial force at the coupler mounting point. In still another embodiment, the first detection system 130a can be connected directly to the flexible transmission member 140. For example, the first detection device 130a can include a strain gage positioned to measure the tension in the flexible transmission member 140.

In any of the above embodiments, the first detection system 130a can be coupled to the engagement link 134 (FIG. 2) to automatically engage the second control link 120 (FIG. 2) when the first detection system 130a detects a failure, a change in tension, or a change in characteristic or state associated with a change in tension. In other embodiments, as discussed above, the annunciation system 160 (FIG. 2) can be configured to indicate the failure, change in tension, or associated change in characteristic or state.

Figure 5:
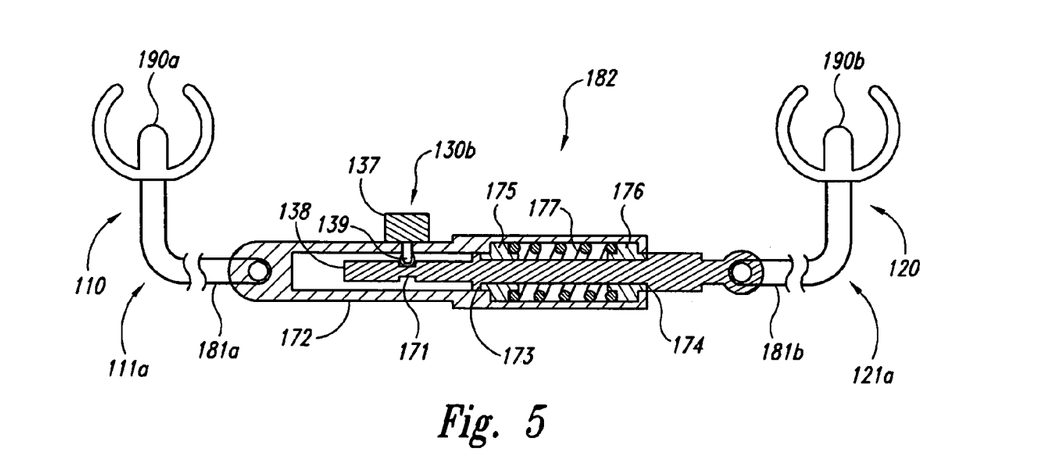
FIG. 5 is a partially schematic illustration of a detection system in accordance with another embodiment of the invention.

FIG. 5 depicts an embodiment of the second detection system 130b, which can be configured to detect a control jam in at least one of the control links 110, 120. In one aspect of this embodiment, the second detection system 130b can be operatively coupled to the forward interconnect 182, which connects the control links 110, 120. For example, the forward interconnect 182 can include a first portion 181a connected to the first portion 111a of the first control link 110, and a second portion 181b connected to the first portion 121a of the second control link 120, with the second detection system 130b connected between the two portions 181a, 181b. The second detection system 130b can include a slide 138 coupled to the second portion 181b of the forward interconnect 182 and a receiver 172 coupled to the first portion 181a of the forward interconnect 182. The slide 138 can translate within the receiver 172 of the second detection system 130b when a threshold force (representing a control jam) is exceeded; however, during normal operation, the slide 138 moves in unison with the receiver 172. Accordingly, when an operator commands a lateral control input with the second control input device 190b, the second portion 181b of the forward interconnect 182 moves to the left or right in FIG. 5. Under normal conditions, when there is no jam in either control link 110, 120, the slide 138 and the receiver 172 move in unison and the first portion 181a of the forward interconnect 182 moves in a corresponding manner, transmitting the control input to the first portion 111a of the first control link 110.

The slide 138 can include a first shoulder 173 spaced apart from a second shoulder 174. The first shoulder 173 can abut against a first collar 175 and the second shoulder 174 can abut against a second collar 176. A resistance element (e.g., a spring) can urge the first collar 175 against the first shoulder 173 and the second collar 176 against the second shoulder 174. In one embodiment, the second detection system 130b includes a microswitch 137, having a plunger 139 received in a notch 171 of the slide 138. When the control links 110, 120 are operating normally, the slide 138 moves with the receiver 172 and the microswitch 137 remains in a single position (open versus closed).

If a portion of the first control link 110 becomes jammed and prevents the first control input device 190a from moving (e.g., a foreign object lodges in a portion of the first control link 110 preventing the first control link 110 from transmitting input signals), the first portion 181a of the forward interconnect 182 will fail to move in response to the operator's lateral control input to the second control input device 190b, discussed above. In this situation, when the operator applies a lateral control input to the second control input device 190b, which would normally cause the forward interconnect 182 to move to the right, the operator will feel resistance in the control system. If the operator exceeds the threshold force, the first shoulder 173 of the slide 138 will exert force on the first collar 175, compressing the resistance element 177, and the slide 138 will translate to the right relative to the receiver 172. As the slide 138 translates to the right, the notch 171 in the slide 138 will translate and cause the plunger 139 of the microswitch 137 to compress and change state, thereby detecting the jam or failure. Because the slide 138 translates, the second control input device 190b can move despite the jam in the first control link 110.

Similarly, if the operator applies a lateral control input to the second control input device 190b, which would normally cause the forward interconnect 182 to move to the left, the operator will feel resistance. If the operator exceeds the threshold force, the second shoulder 174 of the slide 138 will exert force on the second collar 176, compressing the resistance element 177, and the slide 138 will translate to the left relative to the receiver 172. Again the notch 171 will translate, compressing the plunger 139 of the microswitch 137, thereby detecting the jam. The second detection system 130b can be coupled to the engagement link 134 (FIG. 2) to automatically engage the second control link 120 when the second detection system 130b detects the jam. The annunciation system 160 (FIG. 2) can optionally be configured to indicate that a jam has occurred. A detection system similar to the second detection system 130b, described above, can be used with other portions of the control system 100, for example, with the aft interconnect 183 (FIG. 2).

One feature of embodiments of the detection systems 130, described above, is that they can detect failures in the control systems 100 in a timely manner. Another feature of at least some embodiments is that the second control link 120 can be automatically engaged when a failure is detected in the first control link 110. An advantage of these features is that they can reduce the impact of the failure.

From the foregoing, it will be appreciated that specific embodiments of the invention have been described herein for purposes of illustration, but that various modifications may be made without deviating from the spirit and scope of the invention. Apparatuses and methods in accordance with further embodiments of the invention can include other combinations of the features described above. For example, the foregoing embodiments can be applied to reversible or irreversible flight control systems 100, as well as to highly augmented and fly-by-wire or fly-by-light control systems 100. Furthermore, some or all aspects of the foregoing embodiments are not limited to use on aircraft flight control systems 100 and have similar advantages when incorporated into other types of control systems 100. Accordingly, the invention is not limited except as by the following claims.

I claim:

1. A vehicle control system comprising:
   a first control link operatively coupled between at least one control input device and at least one control output device, the first control link being configured to transmit control inputs for a vehicle between the at least one control input device and the at least one control output device during normal operation, the first control link including an elongated flexible input transmission member; and
   a second control link, at least one portion of which is changeable from a disengaged state to an engaged state in response to a structural change in the elongated flexible input transmission member, the at least one portion being inactive when in the disengaged state, the at least one portion being operatively coupled between the at least one control input device and the at least one control output device to transmit control inputs between the at least one control input device and the at least one control output device when in the engaged state.

2. The control system of claim 1, further comprising a detection system operatively coupled to the first control link to detect at least one failure in the first control link.

3. The control system of claim 1, further comprising:
   a detection system operatively coupled to the first control link to detect at least one failure in the first control link; and
   an engagement link operatively coupled to the detection system, the engagement link being configured to automatically couple the second control link between the at least one control input device and the at least one control output device to actively transmit control inputs when the detection system detects the at least one failure in the first control link.

4. The control system of claim 1 wherein the control system further comprises a detection system operatively coupled to the first control link, the detection system being configured to detect a change of tension in the elongated flexible input transmission member.

5. The control system of claim 1, further comprising:
   a detection system operatively coupled to the first control link, the detection system being configured to detect a tension in the elongated flexible input transmission member; and
   an engagement link configured to automatically couple the second control link between the at least one control input device and the at least one control output device to actively transmit control inputs when the detection system detects the tension in the elongated flexible input transmission member of the first control link has decreased below a threshold value.

6. The control system of claim 1 wherein the first control link includes a coupler configured to operatively engage the elongated flexible input transmission member, and wherein the control system further comprises:
   a detection system configured to detect a tension of the elongated flexible input transmission member; and
   an engagement link configured to automatically couple the second control link between the at least one control input device and the at least one control output device to actively transmit control inputs when the detection system detects the tension in the elongated flexible input transmission member of the first control link less than a threshold value.

7. The control system of claim 1 wherein the first control link includes:
   a cable member configured to transmit control inputs between a first portion of the first control link and a second portion of the first control link; and
   a pulley system configured to operatively engage the cable member, the pulley system including two pulley portions pivotally coupled to each other, at least one of the pulley portions being movable relative to the other between a first position and a second position, the at least one portion being in the first position when the cable member is under a first amount of tension, the at least one portion being in the second position when the cable member is under a second amount of tension different than the first amount of tension, the second amount of tension being associated with at least one failure in the first control link, and wherein the control system further comprises:
   a detection system configured to detect movement of the at least one pulley portion between the first and the second positions; and
   an engagement link configured to automatically couple the second control link between the at least one control input device and the at least one control output device to actively transmit control inputs when the at least one pulley portion is in the second position.

8. The control system of claim 1 wherein at least a portion of the first control link includes a cable member having a diameter of less than ⅛ inch and being configured to transmit control inputs between a first portion of the first control link and a second portion of the first control link.

9. The control system of claim 1 wherein at least a portion of the second control link includes a cable member having a diameter of less than ⅛ inch and being configured to transmit control inputs between a first portion of the second control link and a second portion of the second control link.

10. The control system of claim 1, further comprising an actuation control coupled to the second control link and configured to allow an operator to selectively engage, disengage, or both engage and disengage the second control link to actively transmit control inputs between the at least one control input device and the at least one control output device.

11. The control system of claim 1, further comprising:
   at least one detection system operatively coupled to at least one portion of the first and second control links; and
   an annunciation system operatively coupled to the at least one detection system configured to provide at least one indication of the status of the at least one portion.

12. The control system of claim 1 wherein the second control link is configured to be engaged and transmit control inputs simultaneously with the first control link.

13. The control system of claim 1, further comprising:
   a detection system operatively coupled to the first control link and configured to detect a motion limitation of at least one portion of the first control link; and
   an engagement link configured to automatically couple the second control link between the at least one control input device and the at least one control output device to actively transmit control inputs when the detection system detects the motion limitation.

14. The control system of claim 1, further comprising the vehicle, and wherein the vehicle includes an aircraft, the at least one control input device includes a pilot input control and the at least one control output device includes a flight control surface.

15. The control system of claim 1 wherein the at least one control input device includes a first control input device, and wherein the control system further comprises a second control input device coupled to the first control link.

16. A vehicle control system comprising:
   a first control link operatively coupled between at least one control input device and at least one control output device, the first control link being configured to transmit control inputs between the at least one control input device and the at least one control output device, the first control link including an elongated flexible input transmission member positioned to transmit control inputs between a first portion of the first control link and a second portion of the first control link while under tension;
   a detection system operatively coupled to the first control link to detect a tension of the elongated flexible input transmission member;
   a second control link, at least one portion of which is changeable from a disengaged state to an engaged state, the at least one portion being inactive when in the disengaged state and being operatively coupled between the at least one control input device and the at least one control output device to transmit control inputs between the at least one control input device and the at least one control output device when in the engaged state; and
   an engagement link operatively coupled to the detection system, the engagement link being configured to automatically couple the second control link between the at least one control input device and the at least one control output device to actively transmit control inputs when the detection system detects a level of tension corresponding to a failure of the first control link.

17. A vehicle control system comprising:
   a first control link operatively coupled between at least one control input device and at least one control output device, the first control link being configured to transmit control inputs between the at least one control input device and the at least one control output device, the first control link including an elongated flexible input transmission member positioned to transmit control inputs between a first portion of the first control link and a second portion of the first control link while under tension, the first control link including a coupler configured to operatively engage the elongated flexible input transmission member;
   a detection system operatively coupled to the first control link to detect a tension of the elongated flexible input transmission member, the detection system being operatively associated with the coupler;
   a second control link, at least one portion of which is changeable from a disengaged state to an engaged state, the at least one portion being inactive when in the disengaged state and being operatively coupled between the at least one control input device and the at least one control output device to transmit control inputs between the at least one control input device and the at least one control output device when in the engaged state; and
   an engagement link operatively coupled to the detection system, the engagement link being configured to automatically couple the second control link between the at least one control input device and the at least one control output device to actively transmit control inputs when the detection system detects a level of tension corresponding to a failure of the first control link.

18. A vehicle control system comprising:
   a first control link operatively coupled between at least one control input device and at least one control output device, the first control link being configured to transmit control inputs between the at least one control input device and the at least one control output device, the first control link including an elongated flexible input transmission member positioned to transmit control inputs between a first portion of the first control link and a second portion of the first control link while under tension, the elongated flexible input transmission member including a cable member, the first control link further including a pulley system configured to operatively engage the cable member, the pulley system including two pulley portions pivotally coupled to each other, at least one of the pulley portions being movable relative to the other between a first position and a second position, the at least one portion being in the first position when the cable member is under a first amount of tension, the at least one portion being in the second position when the cable member is under a second amount of tension different than the first amount of tension, the second amount of tension being associated with at least one failure in the first control link, the detection system being configured to detect movement of the at least one pulley portion between the first and the second positions;
   a detection system operatively coupled to the first control link to detect a tension of the elongated flexible input transmission member;
   a second control link, at least one portion of which is changeable from a disengaged state to an engaged state, the at least one portion being inactive when in the disengaged state and being operatively coupled between the at least one control input device and the at least one control output device to transmit control inputs between the at least one control input device and the at least one control output device when in the engaged state; and an engagement link operatively coupled to the detection system, the engagement link being configured to automatically couple the second control link between the at least one control input device and the at least one control output device to actively transmit control inputs when the detection system detects movement of the at least one pulley portion between the first and the second positions.

19. An aircraft flight control system comprising:
an aircraft;
at least one pilot input control;
at least one flight control surface;
a first control link operatively coupled between the at least one pilot input control and the at least one flight control surface, the first control link being configured to transmit control inputs between the at least one pilot input control and the at least one flight control surface during normal operation, wherein the first control link includes a cable member configured to transmit control inputs between a first portion of the first control link and a second portion of the first control link;
a detection system operatively coupled to the cable member to detect a tension level in the cable member;
a second control link, at least one portion of which is changeable from a disengaged state to an engaged state, the at least one portion being inactive when in the disengaged state and operatively coupled between the at least one pilot input control and the at least one flight control surface to transmit control inputs between the at least one pilot input control and the at least one flight control surface when in the engaged state; and
an engagement link configured to automatically couple the second control link between the at least one control input device and the at least one control output device to actively transmit control inputs when the detection system detects a tension below a threshold tension level.

20. The aircraft flight control system of claim 19 wherein the first control link includes:
a pulley system configured to operatively engage the cable member, the pulley system including two pulley portions pivotally coupled to each other, at least one of the pulley portions being movable relative to the other between a first position and a second position, the at least one portion being in the first position when the cable member is under a first amount of tension, the at least one portion being in the second position when the cable member is under a second amount of tension different than the first amount of tension, and wherein;
the detection system is configured to detect movement of the at least one pulley portion between the first and the second positions, and further wherein;
the engagement link is configured to automatically couple the second control link between the at least one control input device and the at least one control output device to actively transmit control inputs when the detection system detects movement of the at least one pulley portion between the first and the second positions.

21. A vehicle control system comprising:
first control link means for operatively coupling at least one control input device and at least one control output device, the first control link means being configured to transmit control inputs between the at least one control input device and the at least one control output device during normal operation, the first control link means including an elongated flexible input transmission member; and second control link means for operatively coupling the at least one control input device and the at least one control output device, at least one portion of the second control link means being changeable from a disengaged state to an engaged state in response to a structural chance in the elongated flexible input transmission member, the at least one portion being configured to transmit control inputs between the at least one control input device and the at least one control output device when in the engaged state, the at least one portion being inactive when in the disengaged state.

22. The control system of claim 21, further comprising detection means for detecting at least one failure in the first control link means.

23. The control system of claim 21, further comprising detection means for detecting an amount of tension in a portion of the first control link means, the amount of tension being associated with at least one failure of the first control link means.

24. The control system of claim 21, further comprising:
detection means for detecting at least one failure in the first control link means; and
engagement link means for automatically coupling the second control link means between the at least one control input device and the at least one control output device to actively transmit control inputs when the detection means detects the at least one failure in the first control link means.

25. The control system of claim 21 wherein the at least one control input device includes at least one pilot input control and the at least one control output device includes at least one flight control surface.

26. An aircraft flight control system comprising:
first control link means for actively transmitting control inputs between at least one control input device and at least one control output device during normal operation, the control link means including an elongated flexible input transmission member, the first control link means further including coupler means operatively coupled to the elongated flexible input transmission member, the coupler means having a first state and a second state, the first state associated with a first amount of tension in the elongated flexible input transmission member and the second state associated with a second amount of tension in the elongated flexible input transmission member, the second amount of tension associated with the at least one failure in the first control link;
detection means configured to detect a transition between the first state and the second state;
second control link means for operatively coupling the at least one control input device and the at least one control output device, at least a portion of the second control link means being changeable from an engaged state to a disengaged state, the at least one portion being configured to transmit control inputs between the at least one control input device and the at least one control output device when in the engaged state, the at least one portion being inactive when in the disengaged state; and
engagement means for automatically engaging the second control link means to actively transmit control inputs between the at least one control input device and the at least one control output device when the detection means detects the transition between the first state and the second state.

27. A method for manufacturing an aircraft flight control system comprising:
coupling a first control link between at least one control input device and at least one control output device, the first control link being configured to transmit control inputs between the at least one control input device and the at least one control output device during normal operation, the first control link including an elongated flexible input transmission member; and
coupling a second control link between the at least one control input device and the at least one control output device, with at least one portion of the second control link being changeable from a disengaged state to an engaged state in response to a structural change in the elongated flexible input transmission member, the at least one portion being inactive when in the disengaged state, the at least one portion being operatively coupled between the at least one control input device and the at least one control output device to transmit control inputs between the at least one control input device and the at least one control output device when in the engaged state.

28. The method of claim 27 wherein the method further comprises:
coupling a detection system to the first control link, the detection system being positioned to detect at least one failure of the first control link associated with an amount of tension in the elongated flexible input transmission member; and
connecting an engagement link between the first and second control links, the engagement link being positioned to automatically engage the second control link to transmit control inputs between the at least one control input device and the at least one control output device when the detection system detects a tension in the elongated flexible input transmission member below a threshold value.

29. The method of claim 27 wherein the method further comprises: coupling a detection system to the first control link, the detection system being positioned to detect at least one failure of the first control link associated with an amount of tension in the elongated flexible input transmission member;
connecting an annunciation system to the detection system to indicate the at least one failure to an operator; and
connecting an actuation control to the second control link, the actuation control being positioned to allow the operator to engage the second control link.

30. A method for controlling a control output device of an aircraft flight control system comprising:
transmitting a control input between at least one control input device and at least one control output device via a first control link during normal operation without transmitting the control input to the at least one control output device via a second control link, at least a portion of the second control link between the at least one control input device and the at least one control output device being disengaged, the first control link including an elongated flexible input transmission member; and
engaging the second control link to actively transmit control inputs between the at least one control input device and the at least one control output device in response to a structural change in the elongated flexible input transmission member.

31. The method of claim 30 wherein the method further comprises:
detecting at least one failure in the first control link, the at least one failure being associated with an amount of tension in the elongated flexible input transmission member;
indicating the at least one failure to an operator; and
engaging the second control link based on input received from the operator.

32. The method of claim 30 wherein the method further comprises:
detecting at least one failure in the first control link, the at least one failure associated with the amount of tension in the elongated flexible input transmission member; and
automatically engaging the second control link.

* * * * *

UNITED STATES PATENT AND TRADEMARK OFFICE
CERTIFICATE OF CORRECTION

PATENT NO. : 6,913,226 B2
DATED : July 5, 2005
INVENTOR(S) : Neal V. Huynh It is certified that error appears in the above-identified patent and that said Letters Patent is hereby corrected as shown below:

Column 14,
Line 11, "chance" should be -- change --.

Signed and Sealed this

Sixth Day of September, 2005

JON W. DUDAS
*Director of the United States Patent and Trademark Office*